United States Patent
Jongsma

(10) Patent No.: US 10,148,475 B1
(45) Date of Patent: Dec. 4, 2018

(54) RECEIVER TO PROCESS A LOAD MODULATED ANALOG INPUT SIGNAL

(71) Applicant: PANTHRONICS AG, Graz (AT)

(72) Inventor: Jakob Jongsma, Graz (AT)

(73) Assignee: PANTHRONICS AG, Graz (AT)

( * ) Notice: Subject to any disclaimer, the term of this patent is extended or adjusted under 35 U.S.C. 154(b) by 0 days.

(21) Appl. No.: 15/775,314

(22) PCT Filed: Nov. 4, 2016

(86) PCT No.: PCT/EP2016/076635
§ 371 (c)(1),
(2) Date: May 10, 2018

(87) PCT Pub. No.: WO2017/084891
PCT Pub. Date: May 26, 2017

(30) Foreign Application Priority Data

Nov. 16, 2015 (EP) ..................................... 15194659

(51) Int. Cl.
*H03K 9/06* (2006.01)
*H04L 27/22* (2006.01)

(52) U.S. Cl.
CPC .................................. *H04L 27/22* (2013.01)

(58) Field of Classification Search
CPC ...................................................... H04L 27/22
USPC ...................................................... 375/322
See application file for complete search history.

(56) References Cited

U.S. PATENT DOCUMENTS

| 7,890,080 | B2 | 2/2011 | Wu et al. |
| 9,191,024 | B2* | 11/2015 | Lindemann ............ G01D 3/022 |
| 2007/0026825 | A1* | 2/2007 | Wilson ................ G06K 7/0008 |
| | | | 455/130 |
| 2008/0238622 | A1 | 10/2008 | Rofougaran et al. |
| 2012/0057656 | A1 | 3/2012 | Bae et al. |
| 2014/0111310 | A1 | 4/2014 | Bae et al. |

OTHER PUBLICATIONS

Int'l Search Rep. and Written Opinion of the Int'l Searching Authority for Int'l Pat. App. No. PCT/EP2016/076635 dated Feb. 9, 2017, 8 pgs.

* cited by examiner

*Primary Examiner* — Helene Tayong
(74) *Attorney, Agent, or Firm* — Merchant & Gould P.C.

(57) ABSTRACT

A receiver receives a load modulated analog input signal and outputs digital data detected in the input signal. An in-phase correlator and a quadrature-phase correlator for each of an in-phase component and an quadrature-phase component correlate the in-phase component and the quadrature-component with an in-phase component and a quadrature-phase component of a subcarrier or code clock frequency of the input signal. A combiner combines four output signals of the two in-phase correlators and the two quadrature-phase correlators. A slicer samples an output signal of the combiner at maximum energy levels to output the digital data detected in the input signal.

8 Claims, 3 Drawing Sheets

RECEIVER TO PROCESS A LOAD MODULATED ANALOG INPUT SIGNAL

CROSS-REFERENCE TO RELATED APPLICATIONS

This application is a National Stage Application of PCT/EP2016/076635, filed 4 Nov. 2016, which claims benefit of European Patent Application Serial No. 15194659.7, filed 16 Nov. 2015 and which applications are incorporated herein by reference. To the extent appropriate, a claim of priority is made to each of the above-disclosed applications.

FIELD OF THE INVENTION

The present invention relates to a receiver that receives a load modulated analog input signal and outputs digital data detected in the input signal, which receiver comprises: an in-phase mixer that mixes the input signal with an in-phase carrier frequency and provides an in-phase component of the down-converted input signal and a quadrature-phase mixer that mixes the input signal with a quadrature-phase carrier frequency and provides a quadrature-phase component of the down-converted input signal;
an amplifier to amplify the in-phase component and the quadrature-phase component of the down-converted input signal;
a DC block filter to remove the DC component of the in-phase component and the quadrature-phase component.

BACKGROUND OF THE INVENTION

Document U.S. Pat. No. 7,890,080 B2 discloses such a receiver that is used for radio frequency identification (RFID) devices like RFID readers to communicate with active or passive transponders. In a typical application a passive transponder or tag stores product identification of a product to which it is attached and the reader is used to obtain this product information. The reader is powered and generates a magnetic field from its antenna. When the reader and the tag are within close proximity of each other, the reader generated magnetic field is induced into the antenna of the tag and used to power the tag. The tag also has a transceiver to receive the signal from the reader and to transmit a response back to the reader.

There are standards like ISO/IEC18000-3 or ISO/IEC 14.443 Type A and B or ISO15.693 or ECMA-340 13.56 MHz Near Field Communication (NFC) or company standards like Felica from company Sony that define protocols and types of modulation used to transmit information between the tag and the reader. Some or all of these standards define that the reader transmits data to the tags by changing the magnitude of its transmitted power. Tags receive the transmitted signal and process the received data. The activated tag then replies by transmitting data to the reader. A typical technique is to use load modulation, in which the tag varies the load impedance of its coil by changing its resonance frequency and its quality factor. This action causes a voltage variation at the reader antenna. The receiver of the reader disclosed in FIG. 3 of document U.S. Pat. No. 7,890,080 B2 and shown in FIG. 1 of this patent application processes such load modulated analog input signals to output digital data detected in the input signal.

FIG. 1 shows receiver 1 that comprises a differential amplifier 2 to amplify the load modulated analog input signal from antenna 3. An in-phase mixer 4 mixes the input signal with an in-phase carrier frequency and provides an in-phase component I of the down-converted input signal and a quadrature-phase mixer 5 mixes the input signal with a quadrature-phase carrier frequency and provides a quadrature-phase component Q of the down-converted input signal. Amplifiers 6 and 7 amplify the in-phase component I and the quadrature-phase component Q of the down-converted input signal and DC block filter 8 and 9 remove the DC component of the in-phase component I and the quadrature-phase component Q, which in-phase component I and the quadrature-phase component Q are then digitized by analog-digital converters 10 and 11. The digitized components are then filtered by digital filters 12 and 13 and matched filters 14 and 15 and joined together in a digital decoder 16.

Drawback for this receiver disclosed in document U.S. Pat. No. 7,890,080 B2 is that the matched filtering is done after digital filtering and the characteristics of the down-converted sub-carrier are not exploited thus making it less robust against noise and interferers.

SUMMARY OF THE INVENTION

It is an object of the invention to provide a receiver and device that comprises such a receiver that is more robust with regard to noise and interferers within load modulated analog input signal.

This object is achieved with a receiver and a device comprising such receiver that the receiver furthermore comprises:
an in-phase correlator and a quadrature-phase correlator for each of the in-phase component and the quadrature-phase component to correlate the in-phase component and the quadrature-component with an in-phase component and a quadrature-phase component of a subcarrier or code clock frequency of the input signal;
a combiner to combine four output signals of the two in-phase correlators and the two quadrature-phase correlators;
a slicer to sample an output signal of the combiner at maximum energy levels to output the digital data detected in the input signal.

The use of four correlators that correlate the in-phase component and the quadrature-phase component of the down-converted input signal with the in-phase component and the quadrature-phase component of the subcarrier (ISO14.443) or the code clock frequency (Felica) enables to select always the optimum sub-carrier phase for largest signal to noise ratio. This additionally allows recovering the signal even when sub-carrier pulses are missing due to interference.

The correlators as well as the combiner can either be done by means of analog signal processing or, after analog-to-digital conversion between the DC-block and the correlators by means of digital signal processing.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 1:
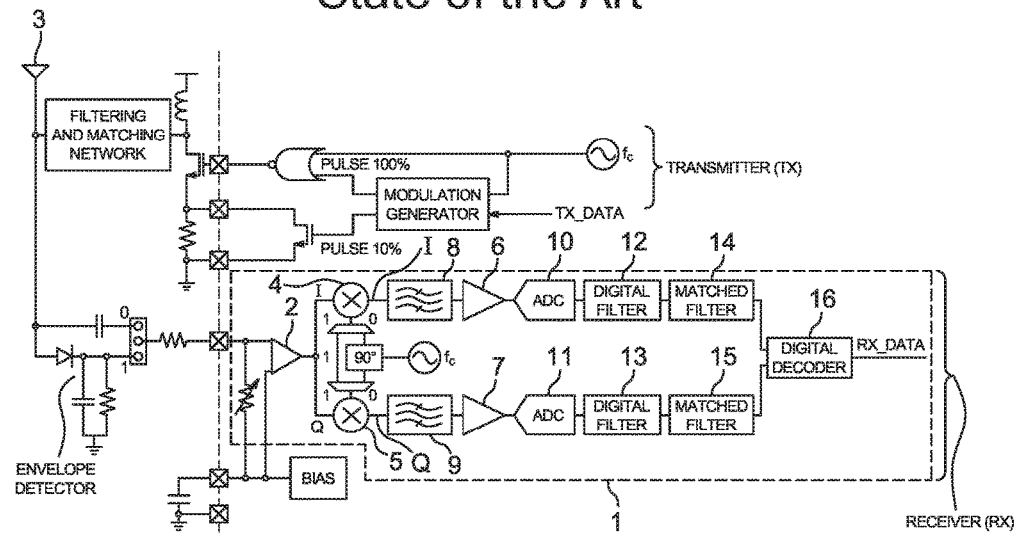
FIG. 1 shows a receiver to process a load modulated analog input signal according to the state of the art.
Figure 2:
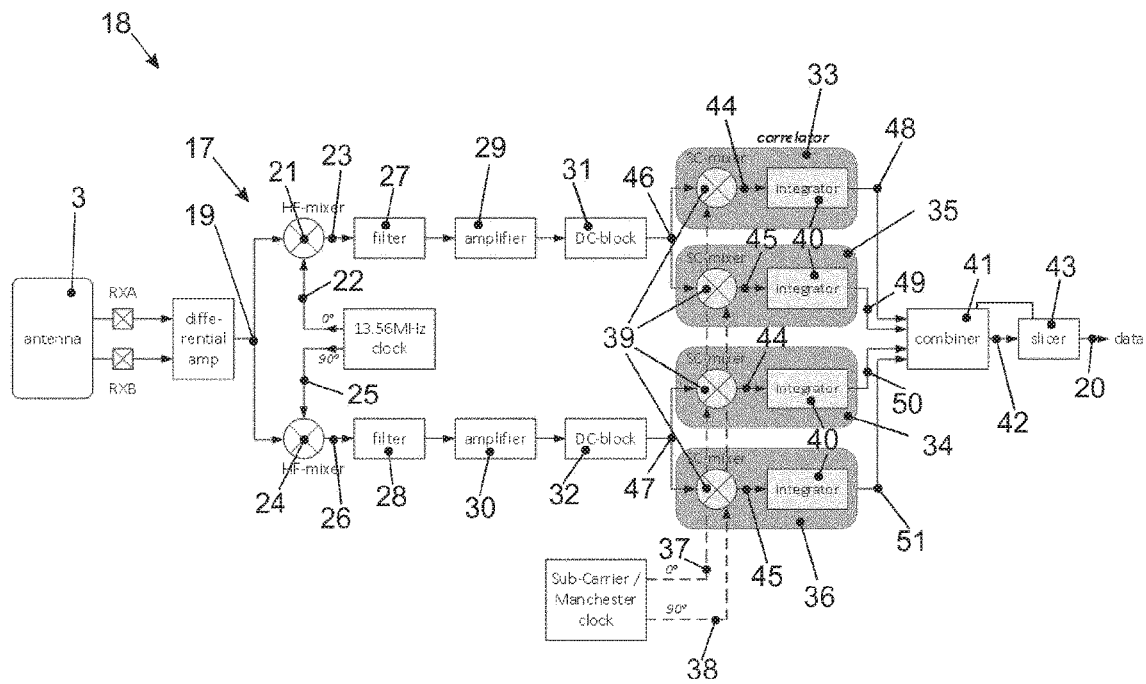
FIG. 2 shows a receiver to process a load modulated analog input signal according to the invention.

FIG. 2 shows a receiver 17 that is part of an RFID reader 18 that is built to receive a load modulated analog input signal 19 and outputs digital data 20 sent from a transponder or tag to the reader 18 and detected in the input signal 19. Reader 18 according to this embodiment of the invention communicates with the tag according to the ECMA-340 13.56 MHz Near Field Communication NFC standard, which NFC Standard in-cooperates communication based on ISO/IEC 14.443 Type A and B and Felica, a company standard from company Sony. Reader 18 furthermore comprises a transmitter, not shown in the figures, to emit a magnetic field via antenna 3 and to transmit data to one or more tags. Such a tag is for instance disclosed in document U.S. Pat. No. 7,890,080 B2 which disclosure of the knowledge of a man skilled in the art is herewith incorporated into this disclosure.

When the reader 18 and the tag are within close proximity of each other, the reader 18 generated magnetic field is induced into the antenna of the tag and used to power the tag. The tag also has a transceiver to receive the signal from reader 18 and to transmit a load modulated response back to reader 18, which receives the response from the tag as load modulated analog input signal 19. Reader 18 comprises an in-phase mixer 21 that mixes the input signal 19 with an in-phase component 22 of the 13.56 MHz carrier frequency and provides an in-phase component 23 of the down-converted input signal. Reader 18 furthermore comprises a quadrature-phase mixer 24 that mixes the input signal 19 with a quadrature-phase component 25 of the 13.56 MHz carrier frequency and provides a quadrature-phase component 26 of the down-converted input signal.

Receiver 18 furthermore comprises filter 27 and 28 to filter unwanted mixing products from the in-phase component 23 and the quadrature-phase component 26 of the load modulated analog input signal 19. Such unwanted mixing products are in particular at 0 Hz as well as at 2*13.56 MHz.

Receiver 18 furthermore comprises amplifier 29 and 30 to amplify the filtered in-phase component and the quadrature-phase component of the down-converted input signal. As the typical modulation of the antenna signal is very small a substantially gain is necessary before further processing of the in-phase component 23 and quadrature-phase component 26.

Receiver 18 furthermore comprises DC block filter 31 and 32 to remove the DC component of the amplified in-phase component and the amplified quadrature-phase component. Such DC component in particular is added by amplifiers 29 and 30 and needs to be removed before further processing of the in-phase and quadrature-phase component.

Receiver 18 in particular comprises in-phase correlators 33 and 34 and quadrature-phase correlators 35 and 36 for each of the in-phase component and the quadrature-phase component to correlate the in-phase component and the quadrature-component with an in-phase component 37 and a quadrature-phase component 38 of a subcarrier or code clock frequency of the load modulated analog input signal 19. In an initial phase of the communication based on the NFC Standard the receiver 18 detects which protocol of which standard is used by the tag close by to reader 18. If at that stage it is decided that reader 18 and tag will communicate based on ISO14.443 Type A or B a square wave that represents the subcarrier frequency of 848 kHz is used and if at that that stage it is decided that reader 18 and tag will communicate based on Felica a square wave that represents the Manchester clock frequency of 212 kHz or 424 kHz is used.

Each of the in-phase correlators 33 and 34 and quadrature-phase correlators 35 and 36 comprises a mixer 39 to mix the in-phase component 46 and quadrature-phase component 47 from the DC block filters 31 and 32 with the in-phase component 37 and the quadrature-phase component 38 of the subcarrier or code clock frequency. Each of the in-phase correlators 33 and 34 furthermore comprises an integrator 40 to continuously integrate the in-phase component 44 and the quadrature-phase component 45 from the mixer 39 over time during an integration window. The integration window is fixed for the different modulation types as follows:

ISO14.443 Type A to four sub-carrier periods;
ISO14.443 Type B to eight sub-carrier periods for a data rate of 106 kbit/s;
ISO14.443 Type B to four sub-carrier periods for a data rate of 212 kbit/s;
ISO14.443 Type B to two sub-carrier periods for a data rate of 424 kbit/s;
ISO14.443 Type B to one sub-carrier periods for a data rate of 848 kbit/s;
Felica to one sub-carrier period.

This means that for instance for ISO14.443 Type A integrator 40 integrates the output of mixer 39 for the integration window or time period of four sub-carrier periods what results in 4.7 us Receiver 18 furthermore comprises a combiner 41 to combine four output signals 48, 49, 50 and 51 of the two in-phase correlators 33 and 34 and the two quadrature-phase correlators 35 and 36. Combiner 41 according to this embodiment of the invention is built to select at least one of the four output signals 48, 49, 50 and 51 of the two in-phase correlators 33 and 34 and the two quadrature-phase correlators 35 and 36 with the strongest energy levels and to add these selected signals to generate the output signal 42 of the combiner 41. This means that combiner 41 measures the energy levels of the four output signals 48, 49, 50 and 51 and only uses the strongest one, two or three of them for the combination based on the fact that only those output signals with a substantial energy level will comprise information related with digital data 20. Output signals of the two in-phase correlators 33 and 34 and the two quadrature-phase correlators 35 and 36 with weak energy levels will not be used for further processing in the output signal 42 of combiner 41.

Another combiner according to another embodiment of the invention could simply add all four output signals 48, 49, 50 and 51 of the two in-phase correlators 33 and 34 and the two quadrature-phase correlators 35 and 36 into the output signal of the combiner. This is a technical simple and robust solution, but the combination of only selected output signals as realized in combiner 41. Both solutions are comparable in complexity and provide similar good results.

Receiver 18 furthermore comprises a slicer 43 to sample the output signal 42 of combiner 41 at maximum energy levels to output digital data 20 detected in the load modulated analog input signal 19. Sampling could be done just at maximum energy levels of output signal 42 or even more preferred the information from the combiner 41, which output signals 48, 49, 50 or 51 were selected by combiner 41 to generate output signal 42, could be used to select the appropriate aligned bit-clock. If for instance combiner 41 selects the two output signals of the two in-phase correlators 33 and 34 as these two output signals comprise a higher energy level as the two quadrature-phase correlators 36 and 37, then slicer 43 selects the in-phase bit-clock to generate the samples and detect digital data 20 in output signal 42. This has the advantage that the sampling point is already close to the optimum and only requires little further adjustment.

Figure 3:
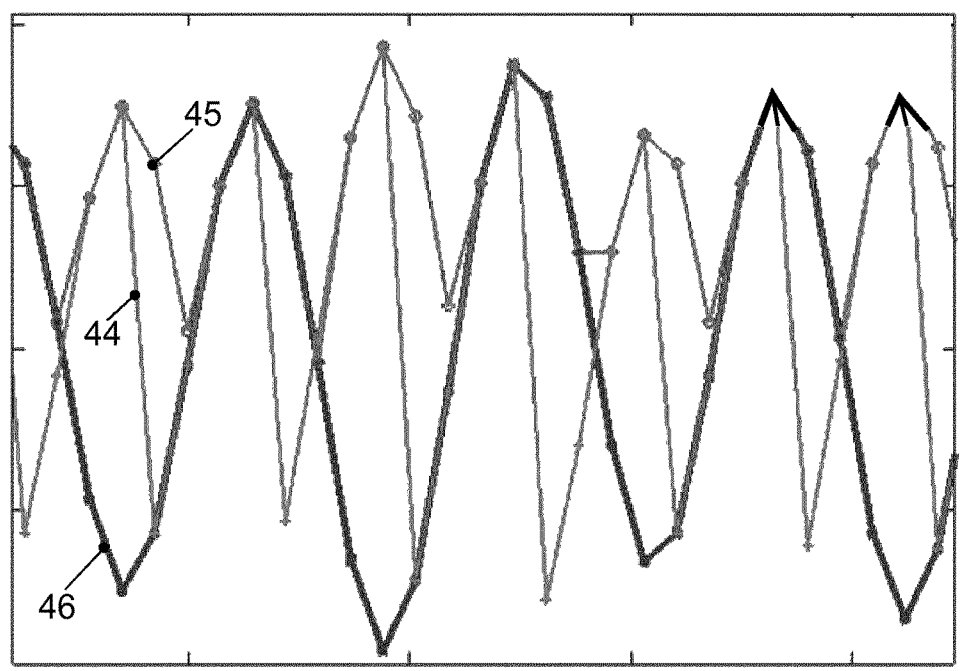
FIG. 3 shows an example of the in-phase component from the DC block filter and the in-phase component and the quadrature-phase component from the mixers of in-phase correlator and the quadrature-phase correlator of the receiver according to FIG. 2.

The use and advantages of the receiver 17 shown in FIG. 2 will now be explained in FIGS. 3 to 5 based on concrete signal examples. FIG. 3 shows as an example of the in-phase component 46 from the DC block filter 31 and the in-phase component 44 and the quadrature-phase component 45 from mixers 39 of in-phase correlator 33 and quadrature-phase correlator 35. Noise is added to the signals show as these waveforms illustrate real world conditions. As can be seen in FIG. 3, the quadrature-phase component 45 from mixer 39 is in phase with the in-phase component 46 from the DC block filter 31, what provides an average output signal. The in-phase component 44 is out of phase with the in-phase component 46 from the DC block filters 31, what results that the average output is close to zero. The energy level of the quadrature-phase component 45 therefore will be higher than the energy level of the in-phase component 44.

Figure 4:
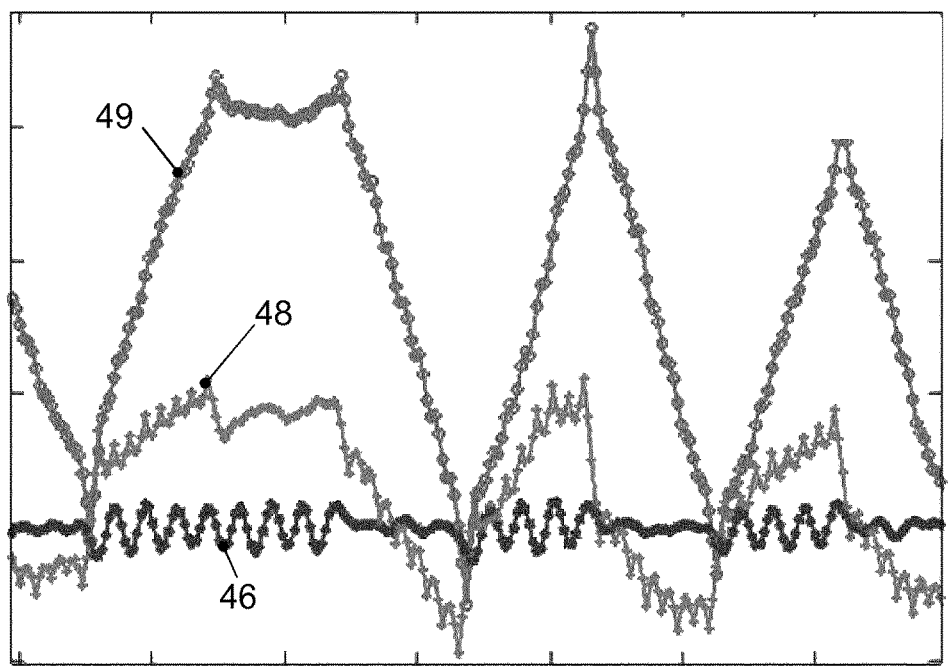
FIG. 4 shows an example of the in-phase component from the DC block filter and the output signals of the in-phase correlator and the output signals the quadrature-phase correlator of the receiver according to FIG. 2 for a load modulated analog input signal according to ISO/IEC 14.443 Type A.

FIG. 4 shows an example of the in-phase component 46 from the DC block filter 31 and the output signal 48 of the in-phase correlator 33 and the output signal 49 the quadrature-phase correlator 35 for receiver 17 that processes the ISO14.443 Type A protocol communication with a tag. The output signal 49 of quadrature-phase correlator 35 results in a significant higher value and energy level than the output signal 48 of the in-phase correlator 33, as can be seen in FIG. 4. In this example the time duration of the integrator window was set to four sub-carrier periods to optimize the result for the ISO14.443 Type A protocol communication. Thus the output signals of the integrators saturate at the bit change from "0" to "1" where eight sub-carrier periods occur. This can be seen in output signal 49, which has a triangular waveform if succeeding bits are the same (e.g. bit "1" after a bit "1") and a flat waveform if succeeding bits change (e.g. bit "1" after bit "0").

Figure 5:
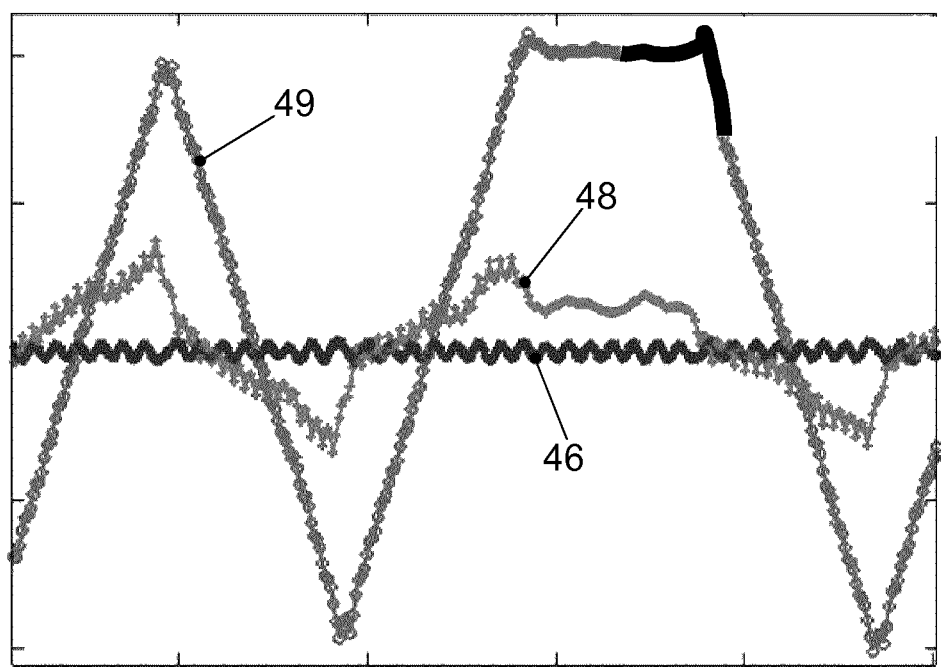
FIG. 5 shows an example of the in-phase component from the DC block filter and the output signals of the in-phase correlator and the output signals the quadrature-phase correlator of the receiver according to FIG. 2 for a load modulated analog input signal according to ISO/IEC 14.443 Type B.

FIG. 5 shows an example of the in-phase component 46 from the DC block filter 31 and the output signals 48 of the in-phase correlator 33 and the output signals 49 the quadrature-phase correlator 35 for receiver 17 that processes the ISO14.443 Type B protocol communication with a tag. The output signal 49 of quadrature-phase correlator 35 results in a significant higher value and energy level than the output signal 48 of the in-phase correlator 33, as can be seen in FIG. 5. In this example the time duration of the integrator window was set to eight sub-carrier periods to optimize the result for the ISO14.443 Type B protocol communication. Thus the output signals of the integrators saturate when two bits of the same type occur. In ISO14.443 Type B protocol communication output signals 48, 49, 50 and 51 of the correlators 33, 34, 35 and 36 can be both positive as well as negative due to the fact of opposite sub-carrier phases for bits "0" and "1". This can be seen in output signal 49, which has a triangular waveform if succeeding bits are the same (e.g. bit "1" after a bit "1") and a flat waveform if succeeding bits change (e.g. bit "1" after bit "0").

The invention claimed is:

1. A receiver that receives a load modulated analog input signal and outputs digital data detected in the input signal, comprising:
    an in-phase mixer that mixes the input signal with an in-phase carrier frequency and provides an in-phase component of the down-converted input signal and a quadrature-phase mixer that mixes the input signal with a quadrature-phase carrier frequency and provides a quadrature-phase component of the down-converted input signal;
    an amplifier to amplify the in-phase component and the quadrature-phase component of the down-converted input signal;
    a direct current (DC) block filter to remove the DC component of the in-phase component and the quadrature-phase component;
    an in-phase correlator and a quadrature-phase correlator for each of the in-phase component and the quadrature-phase component to correlate the in-phase component and the quadrature-component with an in-phase component and a quadrature-phase component of a subcarrier or code clock frequency of the input signal;
    a combiner to combine four output signals of the two in-phase correlators and the two quadrature-phase correlators;
    a slicer to sample an output signal of the combiner at maximum energy levels to output the digital data detected in the input signal.

2. The receiver according to claim 1, wherein each of the in-phase correlators and quadrature-phase correlators comprises:
    a mixer to mix the in-phase component and the quadrature-phase component from the DC block filter with the in-phase component quadrature-phase component of the subcarrier or code clock frequency;
an integrator to continuously integrate the in-phase component quadrature-phase component from mixer over time during an integration window.

3. The receiver according to claim 2, wherein the duration of the integration window depends on a modulation type of the load modulated analog input signal and is fixed for the modulation types according to standard ISO14.443 or standard FeliCa as follows:
    ISO14.443 Type A to four sub-carrier periods;
    ISO14.443 Type B to eight sub-carrier periods for a data rate of 106 kbit/s;
    ISO14.443 Type B to four sub-carrier periods for a data rate of 212 kbit/s;
    ISO14.443 Type B to two sub-carrier periods for a data rate of 424 kbit/s;
    ISO14.443 Type B to one sub-carrier periods for a data rate of 848 kbit/s;
    FeliCa to one sub-carrier periods.

4. The receiver according to claim 1, wherein the combiner is built to add the four output signals of the two in-phase correlators and the two quadrature-phase correlators to generate the output signal of the combiner.

5. The receiver according to claim 1, wherein the combiner is built to select at least one and in particular two of the four output signals of the two in-phase correlators and the two quadrature-phase correlators with the strongest energy levels and to add these selected signals to generate the output signal of the combiner.

6. The receiver according to claim 5, wherein the slicer is built to use the information from the combiner which of the four output signals of the two in-phase correlators and the two quadrature-phase correlators were selected to select an appropriately aligned bit-clock to sample the output signal of the combiner.

7. The receiver according to claim 1, wherein the correlators correlate each of the in-phase component and the quadrature-phase component of the load modulated analog input signal with the in-phase component and the quadrature-phase component of the subcarrier or code clock frequency dependent on a modulation type of the load modulated analog input signal which is fixed for the modulation types according to standard ISO14.443 or standard FeliCa as follows:

ISO14.443 Type A and B with a square wave that represents the subcarrier frequency;

FeliCa with a square wave that represents the Manchester clock frequency.

8. The receiver according to claim 1, further comprising a filter to filter unwanted mixing products from the in-phase component and the quadrature-phase component of the load modulated analog input signal.

* * * * *